United States Patent [19]
Segal

[11] Patent Number: 5,872,575
[45] Date of Patent: Feb. 16, 1999

[54] METHOD AND SYSTEM FOR THE CREATION OF AND NAVIGATION THROUGH A MULTIDIMENSIONAL SPACE USING ENCODED DIGITAL VIDEO

[75] Inventor: Gerald M. Segal, San Carlos, Calif.

[73] Assignee: Digital Media Interactive, San Mateo, Calif.

[21] Appl. No.: 601,596

[22] Filed: Feb. 14, 1996

[51] Int. Cl.⁶ ........................................... G06T 15/70
[52] U.S. Cl. ........................................ 345/473; 382/232
[58] Field of Search ..................... 395/173, 174, 395/175, 806, 807, 119, 137, 138; 382/154, 236, 295, 296, 232; 345/8, 121, 122, 473, 474, 475, 419, 437, 438, 302; 348/39

[56] References Cited

U.S. PATENT DOCUMENTS

| | | |
|---|---|---|
| 5,130,794 | 7/1992 | Ritchey ..................................... 348/39 |
| 5,287,437 | 2/1994 | Deering ................................... 395/127 |
| 5,388,990 | 2/1995 | Beckman .................................. 434/38 |
| 5,499,146 | 3/1996 | Donahue et al. ....................... 386/117 |
| 5,577,961 | 11/1996 | Adamczyk et al. ..................... 463/33 |
| 5,577,981 | 11/1996 | Jarvik ........................................ 482/4 |
| 5,579,026 | 11/1996 | Tabata ........................................ 345/8 |
| 5,581,271 | 12/1996 | Kraemer ..................................... 345/8 |
| 5,615,132 | 3/1997 | Horton et al. ........................... 364/516 |
| 5,617,334 | 4/1997 | Tseng et al. ........................ 364/514 R |

*Primary Examiner*—Stephen S. Hong
*Attorney, Agent, or Firm*—Pennie & Edmonds LLP

[57] ABSTRACT

The present invention provides a method and system for the creation of, and navigation through, a multidimensional virtual space using digital video encoding and decoding techniques. Specifically, the use of a novel database of randomly accessible, pre-rendered short video sequences associated with a set of predefined "motion vectors" allows a user or operator to navigate smoothly through a highly realistic virtual space.

13 Claims, 9 Drawing Sheets

| INSTRUCTION | CAMERA | X POSITION | Y POSITION | Z POSITION | FRAME |
|---|---|---|---|---|---|
| MOVE | DCAM2 | 156 | 24 | 72.00 | 0 |
| MOVE | DCAM2 | 156 | 48 | 72.00 | 15 |
| MOVE | DCAM2 | 156 | 72 | 72.00 | 30 |
| MOVE | DCAM2 | 156 | 96 | 72.00 | 45 |
| MOVE | DCAM2 | 156 | 120 | 72.00 | 60 |
| MOVE | DCAM2 | 156 | 144 | 72.00 | 75 |
| MOVE | DCAM2 | 156 | 168 | 72.00 | 90 |
| MOVE | DCAM2 | 156 | 192 | 72.00 | 105 |
| MOVE | DCAM2 | 156 | 216 | 72.00 | 120 |

| INSTRUCTION | CAMERA | X POSITION | Y POSITION | Z POSITION | FRAME |
|---|---|---|---|---|---|
| MOVE | DCAM2 | 156 | 24 | 72.00 | 0 |
| MOVE | DCAM2 | 156 | 48 | 72.00 | 15 |
| MOVE | DCAM2 | 156 | 72 | 72.00 | 30 |
| MOVE | DCAM2 | 156 | 96 | 72.00 | 45 |
| MOVE | DCAM2 | 156 | 120 | 72.00 | 60 |
| MOVE | DCAM2 | 156 | 144 | 72.00 | 75 |
| MOVE | DCAM2 | 156 | 168 | 72.00 | 90 |
| MOVE | DCAM2 | 156 | 192 | 72.00 | 105 |
| MOVE | DCAM2 | 156 | 216 | 72.00 | 120 |

| CPV | MV | NPV | NPCC |
|---|---|---|---|
| An+2 | Bn+2 | CPV | 2 |
| An | Bn | CPV | 6 |
| An+4 | Bn+4 | CPV | 5 |
| An+6 | Bn+6 | CPV | 1 |
| An+1 | Bn+1 | CPV | 4 |
| An+3 | Bn+3 | CPV | 8 |
| An+5 | Bn+5 | CPV | 3 |
| An+7 | Bn+7 | CPV | 7 |

```
NPCC CODE      X,Y POSITIONS

| CPV | MV | NPV | NPCC |
|---|---|---|---|
| An+2 | CPV | CPV | 1 |
| An | CPV | CPV | 5 |
| An+4 | CPV | CPV | 6 |
| An+7 | CPV | CPV | 2 |
| An+1 | CPV | CPV | 3 |
| An+3 | CPV | CPV | 7 |
| An+5 | CPV | CPV | 4 |
| An+7 | CPV | CPV | 8 |

KEY TO THE STATE TABLE AND TERMS:

CPV = CURRENT POSITION VECTOR
MV = MOTION VECTOR
NPV = NEXT POSITION VECTOR
NPCC = NEXT POSITION CHANGE COORDINATE
K = NORMALIZED STEPWISE FACTOR
X,Y = CARTESIAN COORDINATES OF QUADRANT
O = NO OPERATION

FIG. 7C

| CPV | MV | NPV | NPCC |
|---|---|---|---|
| An | Cn | An+1 | 0 |
| An+1 | Cn+1 | An+2 | 0 |
| An+2 | Cn+2 | An+3 | 0 |
| An+3 | Cn+3 | An+4 | 0 |
| An+4 | Cn+4 | An+5 | 0 |
| An+5 | Cn+5 | An+6 | 0 |
| An+6 | Cn+6 | An+7 | 0 |
| An+7 | Cn+7 | An | 0 |

| NPCC CODE | X,Y POSITIONS |
|---|---|
| 0 | X, Y |
| 1 | X+K, Y |
| 2 | X-K, Y |
| 3 | X+K, Y+K |
| 4 | X-K, Y-K |
| 5 | Y+K, X |
| 6 | Y-K, X |
| 7 | X+K, Y-K |
| 8 | X-K, Y+K |

FIG. 7D

| CPV | MV | NPV | NPCC |
|---|---|---|---|
| An | Dn+7 | An+7 | 0 |
| An+1 | Dn | An | 0 |
| An+2 | Dn+1 | An+1 | 0 |
| An+3 | Dn+2 | An+2 | 0 |
| An+4 | Dn+3 | An+3 | 0 |
| An+5 | Dn+4 | An+4 | 0 |
| An+6 | Dn+5 | An+5 | 0 |
| An+7 | Dn+6 | An+6 | 0 |

KEY TO THE STATE TABLE AND TERMS:

CPV = CURRENT POSITION VECTOR
MV = MOTION VECTOR
NPV = NEXT POSITION VECTOR
NPCC = NEXT POSITION CHANGE COORDINATE
K = NORMALIZED STEPWISE FACTOR
X,Y = CARTESIAN COORDINATES OF QUADRANT
0 = NO OPERATION

METHOD AND SYSTEM FOR THE CREATION OF AND NAVIGATION THROUGH A MULTIDIMENSIONAL SPACE USING ENCODED DIGITAL VIDEO

Each video sequence associated with a motion vector is preferably a relatively short (for example, eight to fifteen frame) sequence which corresponds to an encoded MPEG Group of Pictures (GOP). To allow navigation through the virtual space, a state machine is created which keeps track of the position, direction, and motion of an operator navigating through the virtual space. Based upon the position and direction of the operator in the virtual space, the state machine dictates which motion vector (more specifically, which video sequence associated with a particular motion vector) should be displayed. As an operator moves through the virtual space, the state machine is used to play the appropriate prerendered video sequences through a "virtual projector". The virtual projector cues and plays the prerendered video sequences according to the instructions of the state machine, overlapping in time the video sequence boundaries in such a manner that the displayed video sequences approximate smooth linear motion.

FIELD OF THE INVENTION

The present invention relates generally to computer graphics, and more particularly to a method and system for the creation of and navigation through a multidimensional space using encoded digital video.

BACKGROUND

Most currently available virtual reality or interactive computer systems (such as video games) create images by generating, or "rendering" a plurality of polygons in real time. These rendered polygons are displayed on a screen, and together form a "scene".

Such systems typically allow the user or operator to "move" through the scene and to view various scenes by manipulating a pointing or positioning device such as a joystick or track ball. Input from the pointing or positioning device causes the computer system to calculate the appropriate change in position and, using a three-dimensional mathematical model (often called a "parametric" model) of the objects in the virtual space, render a new scene in real time. An illusion of motion is created by sequentially displaying a series of images that change appropriately in accordance with the inputs from the pointing or positioning device. An example of a commercially available virtual reality package incorporating parametric models is the Virtual Reality Development System manufactured by VREAM, Inc. of Chicago, Ill.

Typical virtual reality or interactive computer systems are limited in the amount of detail or realism they can display because of the large amount of computing power required to render a realistic scene in real time. The vast majority of such systems can only display VGA or slightly better than VGA graphics. Specular highlights, texture mapping, shadows, and other rendering techniques associated with the better rendering and 3D modeling packages (such as 3D Studio®, manufactured by AutoDesk Corporation of Novato, Calif.) are not currently possible in real time on desktop systems, even those incorporating graphics accelerator chips. Moreover, even very powerful and expensive systems, such as supercomputers or very high-end graphics workstations, face limitations in delivering highly realistic scenes in real time because of the computational requirements of rendering such complex scenes.

Although more powerful rendering engines, and more efficient rendering and modeling software are introduced with some frequency, the computational requirements for real time, highly realistic virtual reality or interactive computer applications are still too great for most commonly available computers.

In an attempt to overcome the problems with real time rendering, photographic technologies have been proposed and created that use digitally altered photographs. These technologies, such as QuickTime VR®, manufactured by Apple Computer, Inc. of Cupertino, Calif., allow the viewer to experience a sense of panorama in viewing a scene. However, most such systems place severe limitations on the size, aspect ratio, and color palette that can be supported for real-time playback.

Recently, great advances have been made in the implementation and standardization of certain digital video compression techniques. The Moving Picture Experts Group (MPEG) was chartered by the International Standards Organization (ISO) to standardize a coded representation of video (and associated audio) suitable for digital storage and transmission media. Digital storage media include magnetic computer disks, optical compact disk read-only-memory (CD-ROM), digital audio tape (DAT), etc. Transmission media include telecommunications networks, home coaxial cable TV (CATV), over-the-air digital video, and other media. The goal of MPEG has been to develop a generic coding standard that can be used in many digital video implementations. MPEG has so far produced two standards, known colloquially as MPEG-1 and MPEG-2.

MPEG-1 (officially known as ISO/IEC 11172) is an international standard for coded representation of digital video and associated audio at bit-rates up to about 1.5 Mbits/s. MPEG-1 can typically provide video compression ratios of between 140:1 and 200:1; it is currently used in relatively limited bandwidth devices, such as CD-ROM players. The ISO/IEC 11172 (MPEG-1) standard is incorporated herein by reference.

MPEG-2 (officially known as ISO/IEC 13818) is a standard for coded representation of digital video and associated audio at bit-rates above 2 Mbits/s. MPEG-2 can typically provide video compression ratios of between 40:1 and 60:1; it is intended for use in relatively high bandwidth devices and broadcast television. The ISO/IEC 13138 (MPEG-2) standard is also incorporated herein by reference.

The MPEG compression techniques are based in part on the fact that in most motion picture or video scenes, the background remains relatively stable while much of the action takes place in the foreground; hence, consecutive frames in a video sequence often contain some identical or very similar image information.

MPEG compression generally begins by the creation of a reference frame or picture called an "I" or "intra" frame. Intra frames provide entry points into an MPEG video sequence file for random access, but can only be moderately compressed. I frames are typically placed every 10 to 15 frames in a video sequence. MPEG compression takes advantage of the redundancy often found in sequential frames of video by capturing, compressing, and storing the differences between a set of sequential frames. The other two types of frames in an MPEG sequence are predicted (P) frames and bi-directional interpolated (B) frames. Predicted frames are encoded with reference to a past frame (I or previous P frame), and, in general, are used as a reference for future predicted frames. Predicted frames receive a fairly high amount of compression. Bi-directional interpolated frames provide the highest amount of compression, but require both a past and a future reference in order to be encoded. B frames are never used as references.

Figure 1:
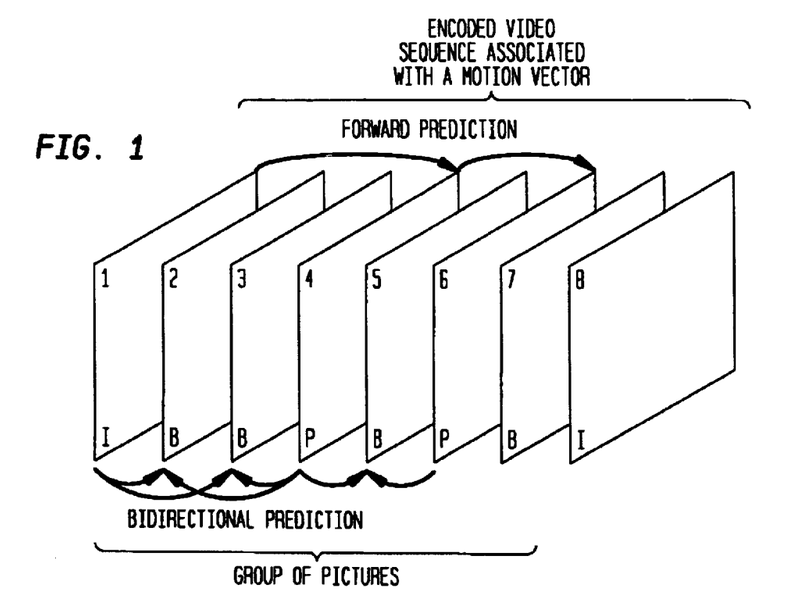
FIG. 1 is a representational diagram showing the general organization of frames in an MPEG video sequence.

The MPEG video standards specify the syntax and semantics of the compressed bit-stream produced by an MPEG video encoder. The standards also specify how this bit-stream is to be parsed and decoded to produce a decompressed video signal. The overall syntax of an MPEG bit-stream is constructed in a hierarchy of several headers, each of which performs a different logical function. For the purposes of this invention, the most important MPEG video bit-stream syntax header is the "Group Of Pictures" (GOP) header. The GOP header provides support for random access, fast search, and editing. A sequence of video frames, or "pictures" is divided into a series of GOPs, where each GOP contains an I frame followed by an arrangement of P frames and B frames. FIG. 1 shows the basic structure of a GOP. Random access and fast search are enabled by the availability of the I frames, which can be decoded independently and serve as starting points for further decoding. The MPEG video standards allow GOPs to be of arbitrary structure and length, and the GOP header is a basic unit for editing an MPEG video bit stream.

Prior systems such as the video game entitled "7th Guest" by the Spectrum Holobyte and Philips Corporation, have used the random access capabilities of MPEG to provide "branching". That is, at a predefined point in the game, an operator may choose from two or more options as to where to go, or what to do next. However, such prior systems do not allow continuous interactive input to be made by the operator, and thus do not provide a highly realistic virtual reality or interactive computer environment. Accordingly, there remains a need in the art for a highly realistic, relatively low cost virtual reality or interactive computer system that allows for the generation of and real time navigation through a virtual space.

SUMMARY OF THE INVENTION

The present invention meets these needs by providing a method and system for the creation of, and navigation through, a multidimensional virtual space using digital video encoding and decoding techniques. Specifically, the use of a novel database of randomly accessible, pre-rendered short video sequences associated with a set of predefined "motion vectors" allows a user or operator to navigate smoothly through a highly realistic virtual space.

In a preferred embodiment, a three dimensional model of the virtual space is generated (using a three dimensional rendering package, such as 3D Studio®) and imported into the system. A coordinate system, including a plurality of fixed points, is defined and imposed on the three dimensional model. The number of degrees of freedom an operator may have, and the areas constrained from navigation may also be defined.

Based on the coordinate system chosen and the geometry of the virtual space, the system creates a database of motion vectors. These motion vectors represent the virtual path followed by an operator when moving from point to point, or when rotating about a fixed point in the virtual space. A separate motion vector is generated for each allowed movement (that is, translation or rotation) within the virtual space.

Each motion vector is associated with a prerendered video sequence which shows the translation or rotation represented by that motion vector. After the translation or rotation represented by each motion vector has been stored in the database, the video sequences associated with the motion vectors are rendered, encoded, and stored. In a preferred embodiment, the system automatically generates instructions for a renderer as to the position and movement of a "virtual camera" through the virtual space. These instructions, called "camera path data", indicate to the renderer which viewpoints and video sequences (associated with the previously defined motion vectors) should be rendered and encoded. Each video sequence associated with a motion vector is preferably a relatively short (for example, eight to fifteen frame) sequence which corresponds to an encoded MPEG Group of Pictures (GOP).

To allow navigation through the virtual space, a state machine is created which keeps track of the position, direction, and motion of an operator navigating through the virtual space. Based upon the position and direction of the operator in the virtual space, the state machine dictates which motion vector (more specifically, which video sequence associated with a particular motion vector) should be displayed. The state machine reflects the number of degrees of freedom an operator may have, and the navigational characteristics of the controller device (such as a joystick or track ball) used to navigate through the virtual space.

As an operator moves through the virtual space, the state machine is used to play the appropriate prerendered video sequences through a "virtual projector". The virtual projector cues and plays the prerendered video sequences according to the instructions of the state machine, overlapping in time the video sequence boundaries in such a manner that the displayed video sequences approximate smooth linear motion. In a preferred embodiment, the last frame of a video sequence associated with a particular motion vector is identical to the first frame in a video sequence associated with an adjoining motion vector.

DETAILED DESCRIPTION

The structure and function of the preferred embodiments can best be understood by reference to the drawings. The reader will note that the same reference numerals appear in multiple figures. Where this is the case, the numerals refer to the same or corresponding structure in those figures.

The preferred embodiments of the present invention include a method and system for the creation of and navigation through a multidimensional space using encoded digital video. A concatenated series of prerendered video sequences (which are associated with predefined "motion vectors") allow navigation through the space. The video sequences are preferably encoded according to the MPEG-1 or MPEG-2 standards discussed above, although other randomly accessible, digital video encoding techniques developed either now or in the future could also be used to encode the video sequences.

The following discussion will be divided generally into two parts: (1) the methods and systems used to create a multidimensional virtual space and the framework needed to navigate within that space, including the use of a coordinate system and the creation of a database of motion vectors and their associated video sequences; and (2) the methods and systems used by an operator to navigate through the virtual space.

Development of the Virtual Space and the Navigational Framework

The first step in creating a navigational system and framework for a virtual space is the creation of the space itself. The virtual space is preferably created using a general purpose computer, such as an IBM-compatible personal computer. The operation and architecture of such computers is well known in the art, and is explained in several references, including The Winn L. Rosch Hardware Bible (second edition), which is incorporated herein by reference. If desired, the virtual space could also be created using more powerful general purpose computers or workstations, or using dedicated computers.

In a preferred embodiment, the general purpose computer used to create the virtual space runs a three dimensional rendering package such as 3D Studio®, manufactured by Autodesk Corporation. Such commercially available rendering packages allow the creation and rendering of highly realistic three dimensional spaces. A virtual space is created by defining the shape and layout of the space, and by defining the shape and location of objects within the virtual space. In a preferred embodiment, the actual rendering (that is, the creation of full images) of the virtual space takes place in a later step, which will be discussed below.

In an alternative embodiment, a real space (such as a building, racetrack, etc.), could be chosen as the basis for the virtual space navigated by an operator. In this alternative embodiment, which will be discussed further below, real video footage (instead of computer rendered images) could be used to show portions of or scenes within the virtual space.

Figure 2:
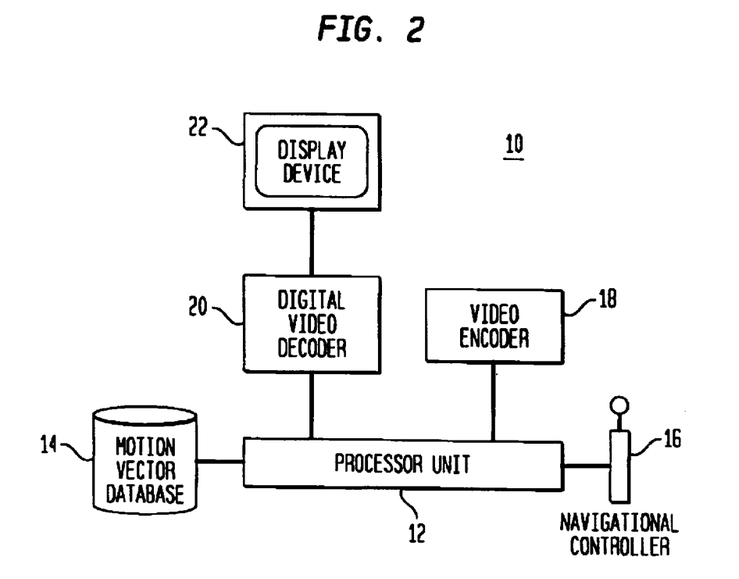
FIG. 2 is a block diagram showing a system for generating a database of motion vectors and their associated video sequences according to a preferred embodiment.

After the virtual space itself has been generated, it is preferably imported into a development system 10 as shown in FIG. 2. Development system 10 includes a processor unit 12, a motion vector array or database 14, a navigational controller 16, a digital video encoder 18, a digital video decoder 20, and a display device 22. The interaction between the components of development system 10 is controlled by processor unit 12, which preferably is or includes a general purpose computer, such as an IBM-compatible personal computer. Again, the operation and architecture of such computers is well known in the art.

Since processor 12 may include a general purpose computer, the rendering package used to generate the three dimensional virtual space may be run on development system 10 if desired. Video encoder 18 and video decoder 20 are preferably MPEG-1 or MPEG-2 type devices, the operation of which are known to those skilled in the art. Navigational controller 16 may be any type of input device, such as a joystick, track ball, keyboard, etc. Display device 22 may be any type of video monitor or video display device. The motion vector database 14 is preferably constructed according to a network node model that allows motion vectors to be located very quickly.

After a three dimensional model of a virtual space is imported into (or generated by) development system 10, a coordinate system is defined and imposed on the three dimensional model. Alternatively, a coordinate system may have been imposed on the three dimensional model by the rendering package used to generate the model.

For the purposes of explanation here, a rectangular, or Cartesian coordinate system is used.

However, it will be understood that a spherical, cylindrical, polar, or any other type of coordinate system may be used with the present invention. In a preferred embodiment, the coordinate system is divided into a plurality of discrete node points, which may be regularly or irregularly spaced. Each point in the virtual space has one or more associated "view" or "current position" vectors which represent the view an operator would have when located at that point and when oriented to face a particular direction.

At each point in the virtual space, an operator navigating through the space may have a number of navigational options, or "degrees of freedom". For example, from any given point the operator may have the option to move forward, move backward, rotate left, rotate right, move up, or move down.

For each option at each point in the coordinate system, a motion vector is stored in motion vector database 14. The motion vectors represent the virtual path followed by an operator when moving or translating from point to point, or when rotating about a fixed point in the virtual space. A separate motion vector is generated for each allowed movement (that is, translation or rotation) within the virtual space. The process by which motion vectors are generated, and the process by which the associated video sequences are rendered and encoded will be explained later.

Figure 3:
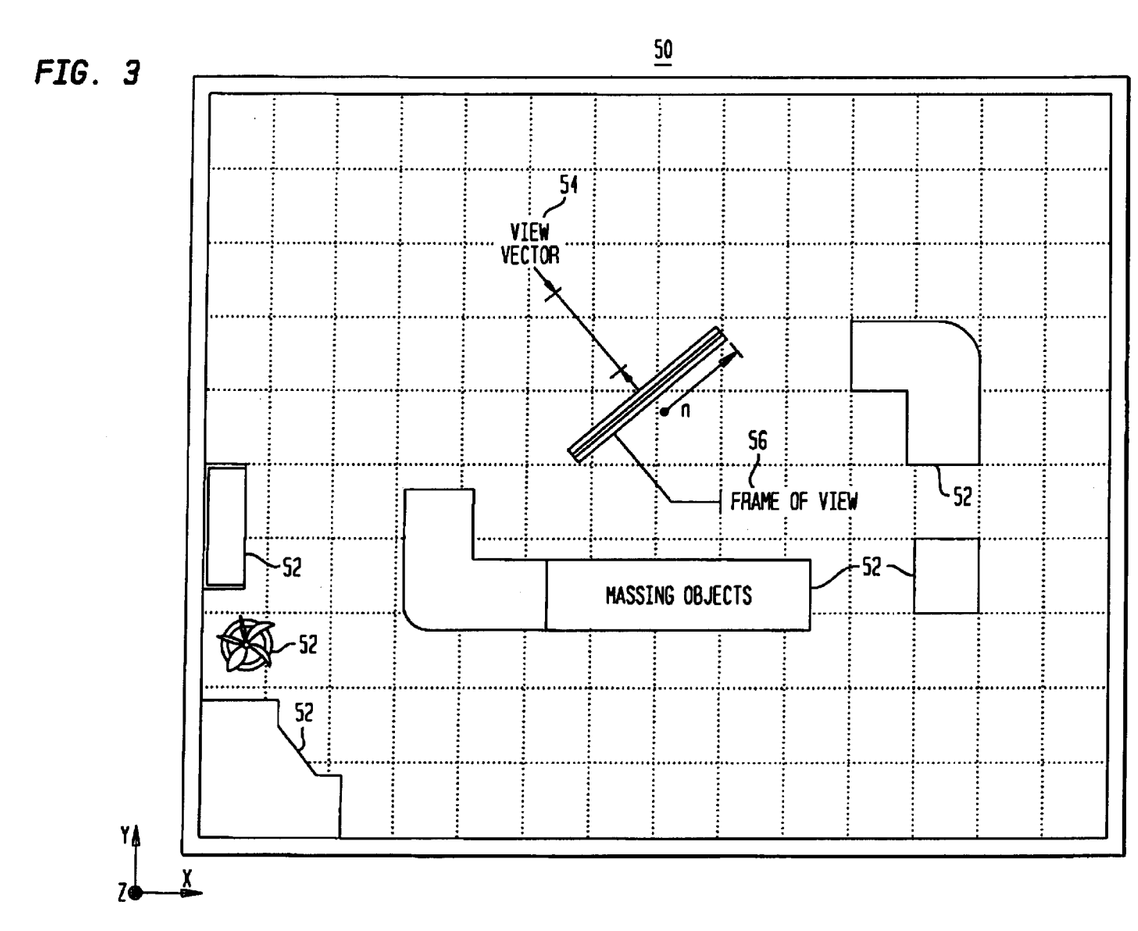
FIG. 3 shows a sample reference grid within a virtual space according to a preferred embodiment.

Referring now to FIG. 3, a sample reference grid 50 representing a rectangular coordinate system within a virtual space is shown. Grid 50 is a rectilinear grid extending in the X and Y directions as shown in FIG. 3.

Grid 50 may also extend into the Z direction, which is normal to the X-Y plane. The virtual space included in grid 50 may include a number of massing objects 52 which may, for example, represent stationary objects within a room. As discussed above, each point in grid 50 may have one or more associated "view" or "current position" vectors 54 which represent the view an operator would have when positioned at a particular point, and when looking in a particular direction. Each view or current position vector 54 has an associated field-of-view or frame-of-view 56, which represents the extent of vision that an operator can have in any one direction, and describes the extent of peripheral vision available.

Figure 4:
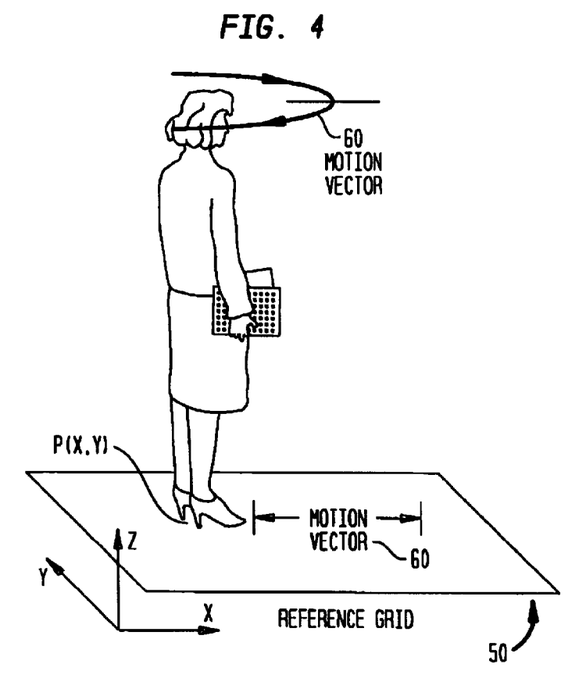
FIG. 4 is a representation of a motion vector in a reference grid according to a preferred embodiment.

As can be seen in FIG. 4, each node point P(x,y) in reference grid 50 preferably has associated with it several possible motion vectors 60 which, as discussed above, represent a translation to a different point in the virtual space, or a rotation about a fixed point in the virtual space. Each motion vector may be a pair of vectors, one in the main direction and one in the return direction. There are preferably vectors for rotate right, rotate left, move forward, look up, and look down. Reciprocal vectors can be used to add motion options not specifically identified. For example, the motion backwards from the node point P(x,y) is the reciprocal of the motion forward to the point P(x−dx, y−dy), where dx and dy are incremental, arbitrarily chosen units of distance in the x and y directions, respectively. Alternatively, separate motion vectors for each possible translation and rotation (including reciprocal motions) could be generated and stored in motion vector database 14.

The method by which a complete set of motion vectors can be created and stored in a motion vector database will now be described. Since motion vectors represent the virtual path followed by an operator when translating from point to point, or when rotating about a fixed point in the virtual space, a separate motion vector is generated for each allowed translation or rotation within the virtual space. Thus, the size of the motion vector database is proportional to the number of points in the virtual space, and the number of degrees of freedom an operator has when navigating through the virtual space. However, in many cases it will be possible to simplify the task of generating a database of motion vectors by constraining movement to certain portions of the virtual space. For example, most virtual spaces will have areas in which an operator will not need or expect to be able to go, such as through solid objects, or to the underside of a table. By prohibiting movement in such areas, the total number of motion vectors required can be reduced.

Once it has been decided which areas in the virtual space can be traversed by the operator, a set of motion vectors can be calculated for each point in those areas. In a preferred embodiment, the motion vectors are generated automatically by development system 10 (See FIG. 2). Appendix A includes a preferred computer program which is used to generate a motion vector database. As can be seen in Appendix A, routines are used to calculate all allowed translation and rotation paths from all allowed points in the virtual space.

After the translation and rotation paths represented by each motion vector have been stored in the database, the video sequences associated with those motion vectors are rendered, encoded, and stored in the database. The rendering is preferably performed using the same rendering package used to create the virtual space. Since rendering takes place "off-line" (that is, before an operator can navigate through the virtual space), the speed of rendering is irrelevant. Accordingly, extremely detailed images (which may take considerable time to render) can be used to show portions of or scenes within the virtual space.

In a preferred embodiment, system 10 automatically generates instructions used by the rendering package to dictate the position and movement of a "virtual camera" through the virtual space. Again, an appropriate rendering package may be installed in and run by system 10, or the rendering package may be installed in and run by a separate computer system. The use of virtual cameras in three dimensional rendering packages is known to those skilled in the art.

The virtual camera instructions, called "camera path data", indicate to the rendering package which view points and video sequences (associated with the previously defined motion vectors) should be rendered. As or after a video sequence has been rendered, the video sequence is encoded by video encoder 18 (see FIG. 2) and stored in the motion vector database 14 linked to its associated motion vector.

Figure 5:
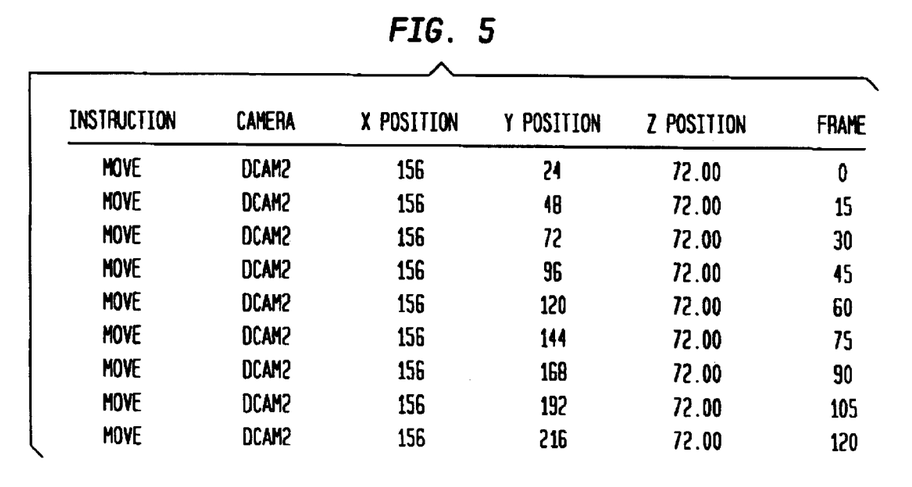
FIG. 5 is a sample listing of camera path data according to a preferred embodiment.

The computer program included in Appendix A also contains routines which are used to generate camera path data. FIG. 5 is an example of camera path data as generated according to a preferred embodiment. The exemplary camera path data of FIG. 5 shows the movement instructions for a virtual camera (called "DCAM2") in the Y direction only, with no motion in the X and Z directions. Similar camera path data can be generated to record movement with components along the X and Z axes, and to represent rotation 30 about a fixed point. Of course, any motion in any direction could be included in the camera path data.

The first row of FIG. 5 shows that the virtual camera DCAM2 begins at an X position of 156, a Y position of 24, and a Z position of 72. Recording of the video sequence begins at Frame 0. As can be seen in the subsequent rows, DCAM2 moves in the Y direction in increments of 24 units for every 15 frames recorded. So in this example, the video sequence associated with a motion vector representing translation in the Y direction (from one point to another) would be 15 frames long, and would cover a distance of 24 units in the Y direction. The number of units moved in any direction depends upon the spacing (that is, distance) between points within the virtual space.

In an alternative embodiment, where the virtual space to be navigated through is based upon a real physical space, the camera path data could be used to control real automated cameras (sometimes called "motion controlled cameras") which move through and record images of the real space.

As discussed above, the video sequences may be encoded (using video encoder 18) either while they are being rendered, or after they have been rendered. Each video sequence begins with a "key frame", which is a frame from which the video sequence can be accessed after it has been stored in the database. Each video sequence preferably also ends with a key frame which is the first frame of a possible subsequent video sequence.

In a preferred embodiment which incorporates MPEG encoding, each video sequence associated with a motion vector includes an MPEG Group of Pictures (GOP) which begins with an I frame (See FIG. 1). Thus, in an embodiment incorporating MPEG encoding, the "key frames" correspond to the MPEG I frames. Each encoded video sequence associated with a motion vector also ends with an I frame from a next possible video sequence. By always starting and ending an encoded video stream with an I frame (or other key frame), the appearance of smooth motion can be achieved when navigating through the virtual space. Again, I frames are typically placed in every 8 to 15 frames (i.e., every ¼ to ½ second) of video footage. However, I frames could be placed closer together if dictated by the location or spacing of reference points within the virtual space, or by other factors.

After the motion vector database (including the associated encoded video sequences) is complete, a state machine is automatically created. This state machine keeps track of the position, orientation, and motion of an operator navigating through the virtual space; and based upon the position, orientation and motion of the operator in the virtual space, the state machine dictates which motion vector (more specifically, which video sequence associated with a particular motion vector) should be displayed at any given time. The state machine reflects the number of degrees of freedom an operator may have, and the navigational characteristics of the navigational controller 16 (see FIGS. 2 and 8) used to navigate through the virtual space. The use of state machines is well known in the art, and there are many different types of state machines that could be used with the present invention. Accordingly, the specific techniques used to generate a preferred state machine will not be described in detail.

FIGS. 6A–6D contain graphical representations of selected motion vector node geometries according to a preferred embodiment. FIGS. 6A–6D represent motion and orientation in two dimensions (here, the X-Y plane) only.

However, it will be understood that similar figures could be used to represent motion and orientation in more than two dimensions.

Figure 6A:
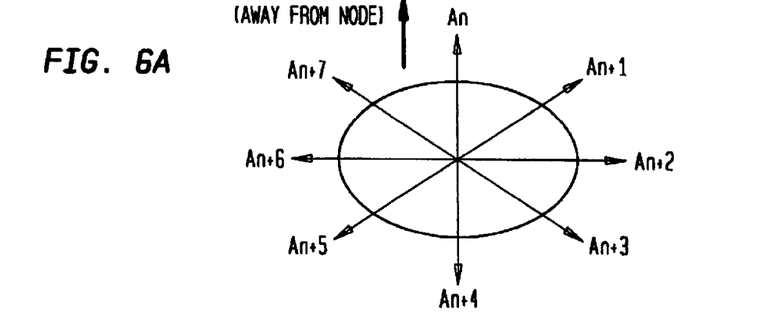
FIGS. 6A–6D are illustrative diagrams showing possible orientations and motions of an operator at a particular point in a virtual space.
Figure 6B:
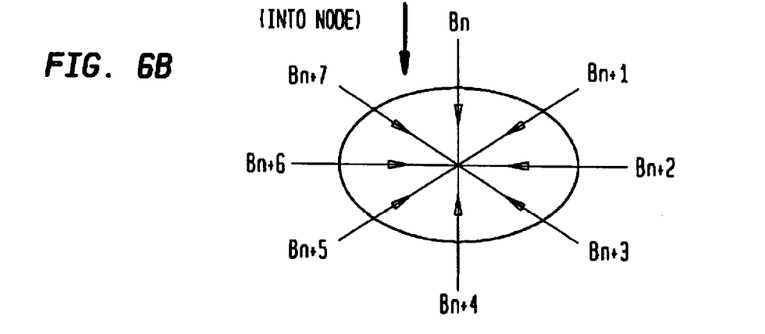

FIG. 6A represents the possible orientations and motions of an operator when facing or moving away from a node point in the virtual space. Each labeled arrow (An through $A_{n+7}$) represents a possible orientation (or direction of motion) when an operator is positioned at a particular node point P(x,y) in the virtual space. By way of analogy, each of the labeled arrows could be equated with the directions shown on a compass. For example, $A_n$ could represent due north, $A_{n+4}$ could represent due south, $A_{n+5}$ could represent southwest, etc. Similarly, FIG. 6B represents the possible orientations or directions of motion when moving into a particular node point P(x,y).

Figure 6C:
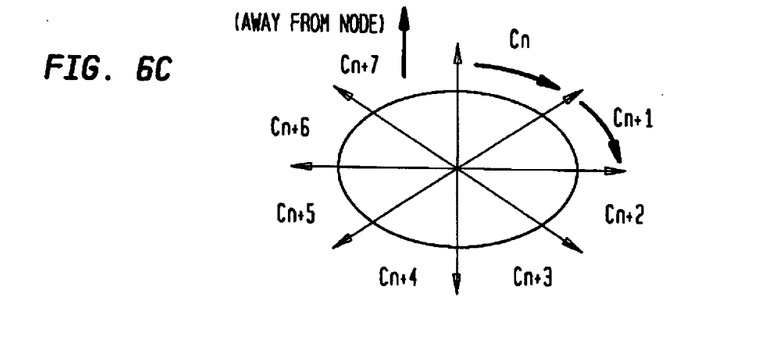
Figure 6D:
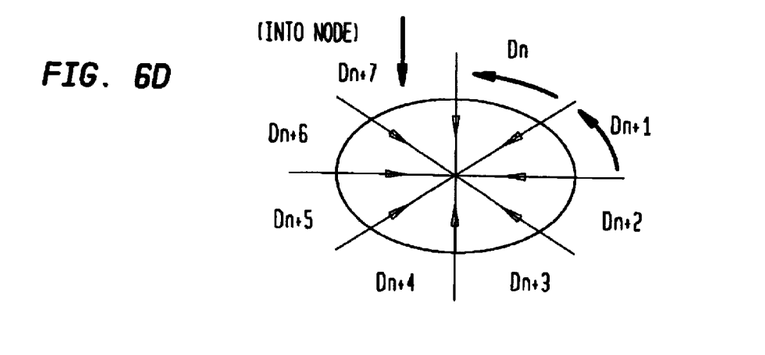

FIG. 6C represents the motion of an operator when rotating to the right about a particular node point P(x,y). Here, the various motions (labeled $C_n$ through $C_{n+7}$) represent one-eighth turns around the node point P(x,y). For example, $C_n$ represents a one-eighth turn around a node point beginning facing in the "due north" direction, and ending facing in the "northeast" direction. similarly, FIG. 6D represents a left rotation about a fixed node point P(x,y). For example, the motion labeled $D_{n+1}$ represents a one-eighth turn about a node point beginning facing in the "due east" direction, and ending facing in the "northeast" direction.

FIGS. 7A–7D are exemplary state tables which show beginning and end states for particular motions in the virtual space. Here, only the move forward, move backward, rotate left, and rotate right substates are shown. However, it will be understood that other substates, such as move up, move down, look up, and look down could also be included in the present invention.

Figure 7A:
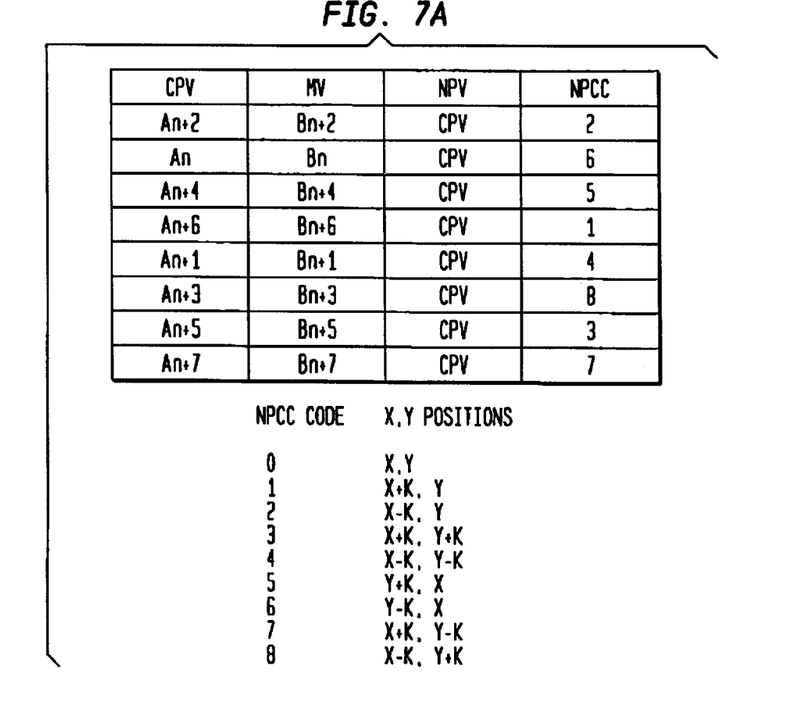
FIGS. 7A–7D are examples of state tables as used by a state machine to determine the motion and orientation of an operator navigating through a virtual space.

The state tables shown in FIGS. 7A–7D each include four columns. The first column includes the CPV, or current position vector. The current position vector shows the orientation of an operator at a particular point P(x,y) in the virtual space. For example, the first entry in the CPV column of FIG. 7A shows an orientation in the $A_{n+2}$ direction (see also FIG. 6A).

The second column includes the MV (motion vector) representing a rotation about, or translation from, that point P(x,y). The third column includes the NPV, or next position vector. The next position vector represents the orientation of an operator after the rotation or translation represented by the motion vector has taken place. In FIG. 7A, the NPV is always the current position vector since after moving backwards, the operator remains oriented in the same direction. The fourth column includes the NPCC, or next position change coordinate. The next position change coordinate here represents the change in the position of the operator when making a particular movement in the virtual space. The NPCC code, as shown in FIGS. 7A–7D, represents the type and direction of motion in the x and y directions caused by the execution of a motion vector. The normalized stepwise factor k represents an arbitrary unit of distance between points in the coordinate system, where x is defined as positive going to the right, and y is defined as positive going up. The operation of the state machine will be explained further in connection with the discussion of navigation through the virtual space.

Navigation Through the Virtual Space

After the motion vector database has been completed and the desired state machine established, a player program or "shell" can be used to play the video sequences associated with the stored motion vectors as the operator navigates through the virtual space. A preferred player program is included in Appendix A.

Figure 8:
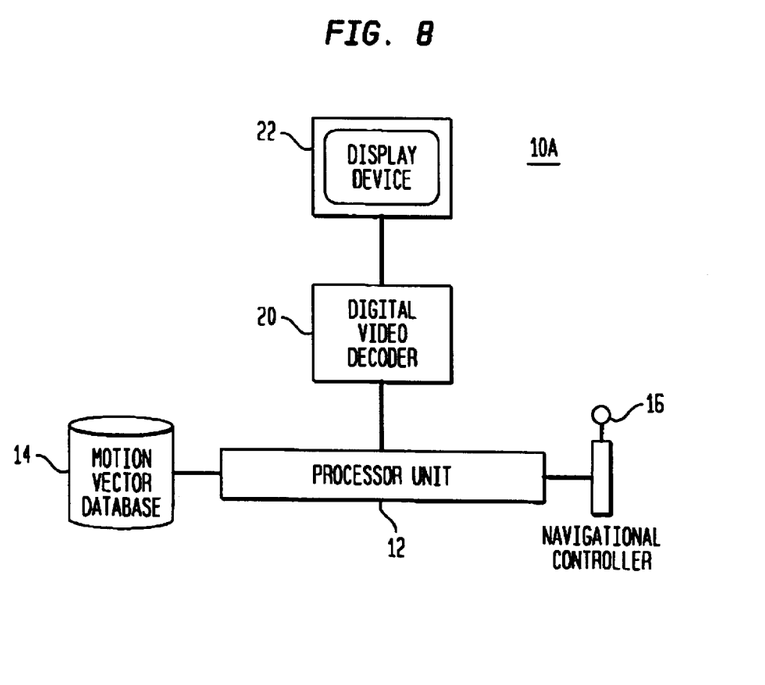
FIG. 8 is a block diagram of a playback system according to a preferred embodiment.

The player program preferably runs on a playback system 10A as shown in FIG. 8. System 10A is nearly identical to the system 10 shown in FIG. 2, except that a video encoder is not required in system 10A. Also, the processor unit 12 in system 10A (which again, may be a general purpose computer) need not be able to run or interface with a rendering package.

The player program operates the state machine discussed above to obtain the appropriate motion vector based on the current operator position, orientation, and motion. So when an operator navigating through the virtual space changes his or her position by means of navigational controller 16, the appropriate motion vector is selected from database 14, and the encoded video sequence associated with it is decoded by decoder 20, and displayed on display device 22.

Figure 9:
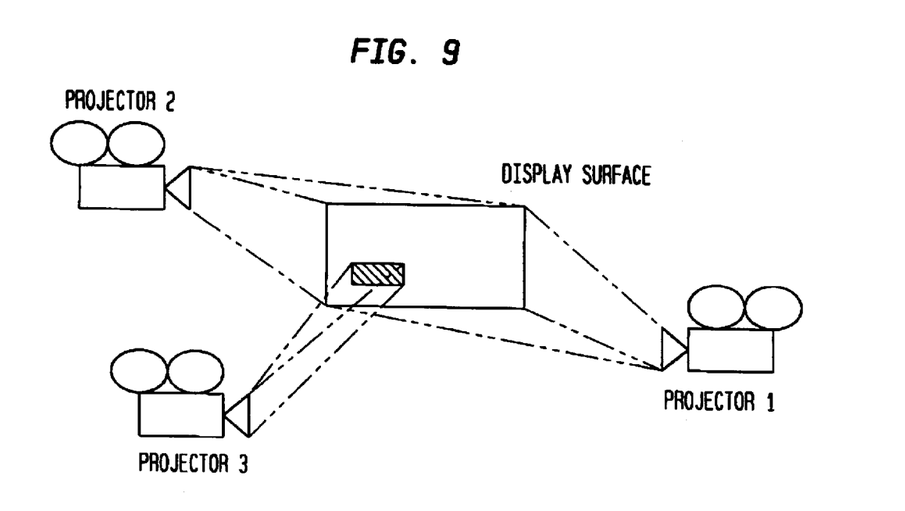
FIG. 9 is a diagram conceptually illustrating the use of virtual projectors according to a preferred embodiment.

To produce a smooth transition from one video sequence to another, a preferred embodiment includes the concept of "virtual projectors". Such virtual projectors, shown conceptually in FIG. 9, are used in the caching, queuing, and running of video sequences to be displayed on display device 22.

Figure 11:
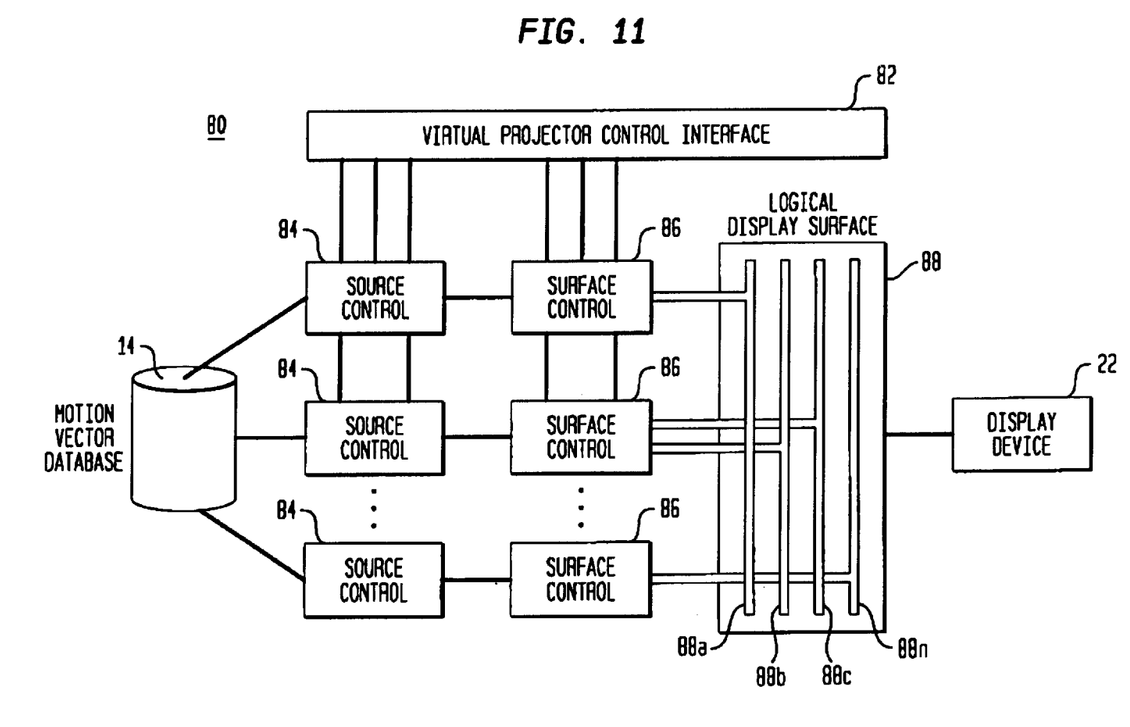
FIG. 11 is a diagram showing the control and operation of virtual projectors according to a preferred embodiment.

FIG. 11 is a block diagram showing a virtual projector system 80 according to a preferred embodiment. Virtual projector system 80 may be implemented in software or hardware to manage the caching, queuing, and running of video sequences. Virtual projector system 80 preferably includes a virtual projector control interface 82, one or more source control elements 84, and one or more surface control elements 86. Virtual projector control interface 82 interacts with the state machine operated by the player program to determine which motion vectors (or more specifically, which associated video sequences) should be extracted from database 14, and which extracted video sequences should actually be displayed on display device 22. Virtual projector control interface 82 controls source control elements 84, which are used to extract from motion vector database 14 the desired video sequences. Surface control elements 86, which correspond to the individual projectors shown in FIG. 9, are also controlled by virtual projector control interface 82 and receive video sequence information from source control elements 84. More specifically, virtual projector control interface 82 controls the timing and output of surface control elements 86.

The outputs of surface control elements 86 are "displayed" on logical display surface 88, which may include one or more virtual surfaces 88a through 88n. Surface control elements 86 may generate an output which is displayed on more than one virtual surface, and more than one surface control element 86 may project onto the same surface. Each surface 88a–88n may be assigned a specific priority of display. For example, the images displayed on surface 88a may be made to appear in front of images displayed on surface 88c. Such display techniques are commonly used, for example, in personal computers running a Microsoft® Windows® or Apple® MacIntosh® type user interface. The number of surfaces used is dependent upon the capabilities of the hardware and operation environment of playback system 10A (see FIG. 8). Using techniques known to those skilled in the art, the images displayed on surfaces 88a–88n may then be fed to and shown on display device 22 so as to be visible to the operator.

To seamlessly concatenate (or "string together") a series of video sequences, surface control elements 86 preferably function in a way similar to that of synchronized movie theater projectors. In a movie stored on several separate reels of film, the last few frames of film on one reel are typically duplicated on a subsequent reel. By synchronizing the projectors, these identical frames can be projected simultaneously from both reels. When the film in one projector runs out, the second projector continues, creating a seamless transition between film reels.

The preferred virtual projector system 80 similarly uses the concepts of synchronization and frame overlap to allow a smooth transition between concatenated video sequences. As was discussed above, each video sequence associated with a motion vector begins with a "keyframe", which is an MPEG I frame in a preferred embodiment. Each video sequence also ends with a keyframe (preferably an MPEG I frame) that is identical to the first frame in a next possible video sequence. Thus, when a first surface control element 86 displays the last frame in a video sequence on a particular surface (for example, surface 88a), a second surface control element 86 simultaneously displays the identical first frame in a subsequnt sequence on that same surface. The second surface control element 86 then continues to display the remaining frames in that subsequent video sequence. This process is repeated for each video sequence displayed. Again, virtual projector control interface 82 controls the timing and output of each surface control element 86. Of course, if the operator ceases to move through the virtual space, then the last frame of the last video sequence may be continuously displayed on display device 22.

In addition to permitting the seamless concatenation of video sequences, independently controllable surface control elements 86 could also be used to provide picture-in-picture effects. For example, one surface control element could be used to display the scene outside a car's windshield, and another surface control element could be used to display the scene shown in a car's rear view mirror.

In addition, short MPEG video sequences (called Dynamic Motion Kernels, or DMKs) representing kinetic segments or effects within a larger scene (such as the motion of an object across a room) can be stored and indexed in the motion vector database 14, and displayed using virtual projector system 80.

Further Details of State Machine Operation

As was discussed above with respect to FIGS. 6A–6D and 7A–7D, a preferred embodiment incorporates a player program running a state machine to permit navigation through a virtual space. These Figures will be used explain below further details of state machine operation in a preferred embodiment, and the manner in which motion vectors are retrieved and queued.

When navigating through a virtual space, an operator is always at some point P(x,y) which may have several possible motion vectors associated with it. The state machine is used to keep track of which particular motion vector should be accessed next. For example, FIG. 7A represents the state table for the "move backward" substate. When an operator is at a node point P(x,y) facing the $A_{n+2}$ direction (see FIG. 6A) and attempts to move backward (for example, by pulling back on a joystick), the motion vector retrieved will be a $B_{n+2}$ type motion vector (see FIG. 6B). The video sequence associated with that particular motion vector will be queued and played by a virtual projector. The next position vector will be the previous current position vector (which is $A_{n+2}$), and the next position change coordinate will be x–k,y. That is, the operator begins the move at a particular point P(x,y) facing in the $A_{n+2}$ direction, which is directly along the positive X direction. The operator moves backwards while facing the $A_{n+2}$ direction, and thus ends at a point P(x–k,y) still facing the $A_{n+2}$ direction. The $B_{n+2}$ type motion vector representing that particular backwards move is retrieved, and the associated video segment displayed.

Figure 7B:
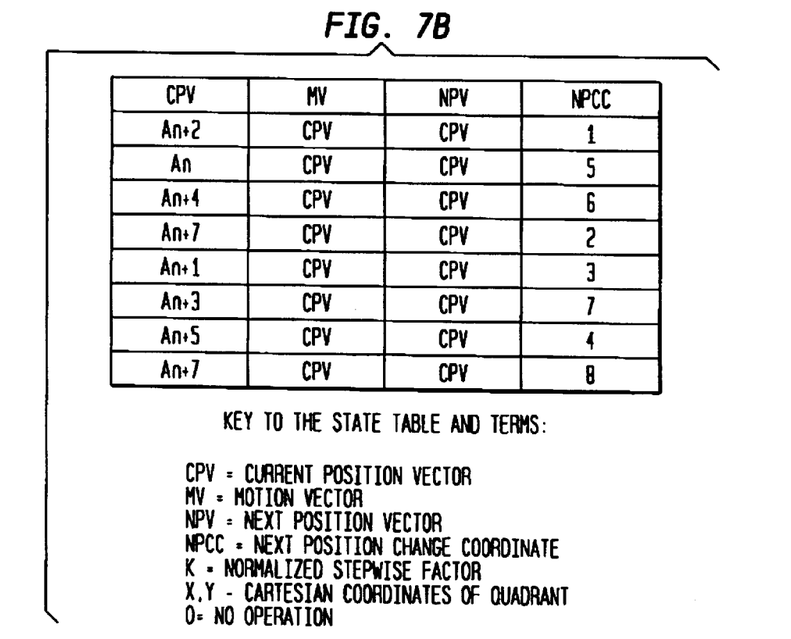

The state table for the "move forward" substate shown in FIG. 7B is similar. For example, when an operator is at a node point P(x,y) facing the $A_{n+1}$ direction and attempts to move forward (for example, by pushing forward on a joystick), the motion vector retrieved will be an $A_{n+1}$ type motion vector. The video sequence associated with that particular motion vector will be queued and played by a virtual projector. The next position vector (i.e., the position vector when the next point is reached) remains $A_{n+1}$, and the next position change coordinate is x+k, y+k. That is, the operator begins at a node point P(x,y) facing in the $A_{n+1}$ direction, moves in the $A_{n+1}$ direction, and ends up at a node point P(x+k, y+k) still facing in the $A_{n+1}$ direction. The $A_{n+1}$ type motion vector associated with that particular forward move is retrieved, and the associated video segment displayed.

Figure 7C:
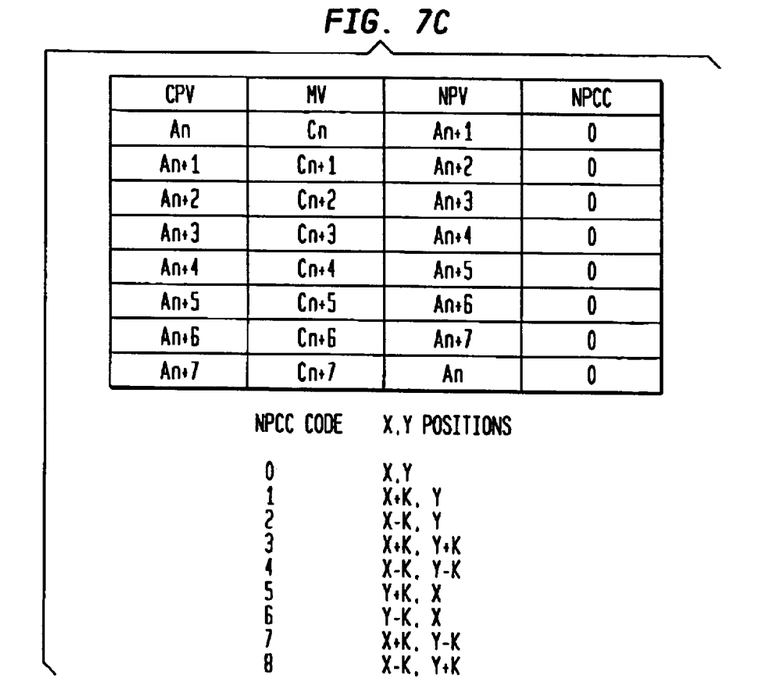
Figure 7D:
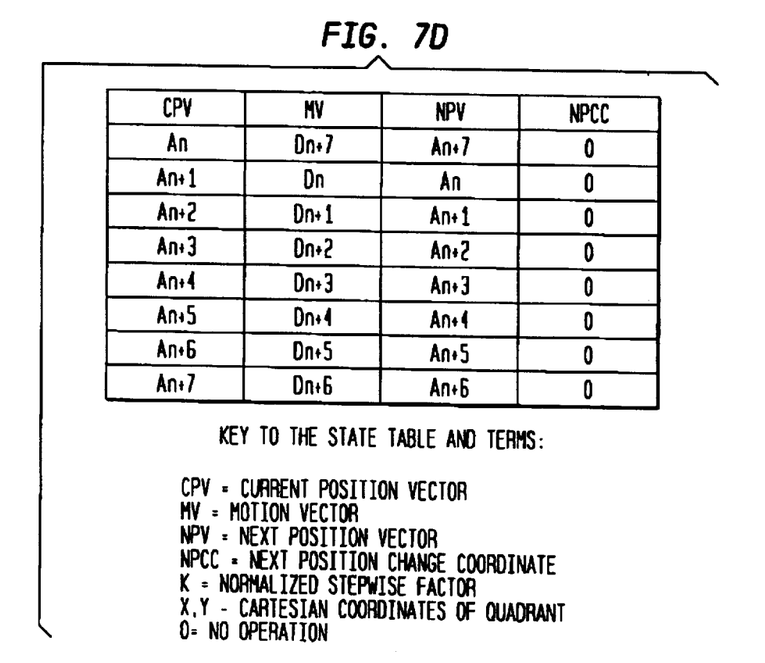

The state tables for rotation about a fixed point P(x,y) are shown in FIGS. 7C and 7D. For example, the first line of the table shown in FIG. 7C specifies the turn right substate where an operator is at a point P(x,y) facing the An direction. If an operator attempts to rotate right about that point (for example, by pushing a joystick to the right), the motion vector retrieved will be a $C_n$ type motion vector which represents a one-eighth rotation to the right. The video sequence associated with that particular motion vector will be queued and displayed. The next position vector is $A_{n+1}$, and the next position change coordinate is x,y (which is represented by the code 0). That is, an operator begins at a point P(x,y) facing the $A_n$ direction. The operator then makes a one-eighth turn around the point and remains at point P(x,y), but now faces the $A_{n+1}$ direction. The $C_n$ type motion vector representing that particular rotation is retrieved, and the associated video segment displayed.

The operation of the state table representing a left rotation is analogous to the operation of the right rotation state table, and will not be discussed here.

Efficient Retrieval of Motion Vectors

The motion vectors are preferably arranged in database 14 with a specific schema designed to optimize the relationship between the motion vectors' geometrical relationship in the virtual space, and the representation of those vectors in the layout of the database (which is preferably on a recorded magnetic and/or optical disk). For example, the overall speed and responsiveness of the system could be enhanced by locating the data for motion vectors likely to be played close together in time physically close together on the disk or other storage medium. Other retrieval time optimization techniques know to those skilled in the art could also be used.

Figure 10:
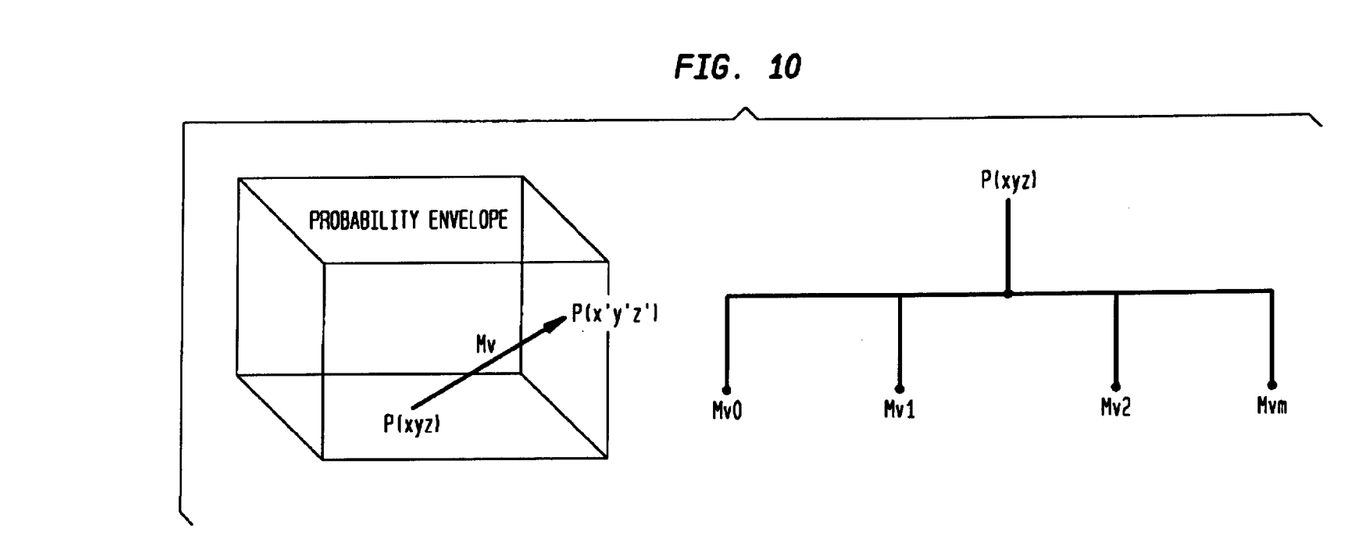
FIG. 10 is a diagram conceptually illustrating a motion vector probability envelope.

To further increase the speed of motion vector retrieval, a set of motion vectors can also be characterized mathematically as a set of "probability vectors" (see FIG. 10). Taken as a whole, this set is equivalent to a "probability envelope". That is, at any given point P(x,y,z) in the virtual space there may be several possible motion vectors (shown in FIG. 10 as Mv0–Mvm) representing possible translations or rotations in the virtual space. The probability that motion vectors associated with that point (or with nearby points) will be required soon is relatively high. The probability that a motion vector associated with a more distant point will be needed soon is lower. So the probability that a particular vector will be used to generate the next video sequence displayed is determined by the position and direction of the operator traveling through the virtual space, and by any rules that may apply.

Computer programs can be used to include any particular factors in determining motion vector probabilities. The database engine can also be optimized for particular constraints or probability-determining factors. The factors used in determining which motion vector in the envelope is most likely to be needed next can include position, direction, velocity, and higher order factors.

By using virtual projector system 80 (see FIG. 11) to cache and queue the next possible motion vectors according to their probability of being called (such that the ones most likely to be called are queued most rapidly for display), the overall speed and responsiveness of the system can be enhanced. For example, a point P(x,y,z) within the virtual space may have five possible motion vectors associated with it. So when an operator arrives at or near the point P(x,y,z), the five video sequences associated with those five possible motion vectors could be cached and queued in five surface control elements 86. After the operator indicates (through navigational controller 16 (see FIG. 8)) which motion vector is appropriate, the virtual projector control interface 82 commands the surface control element 86 containing the video sequence associated with that motion vector to display the sequence in the manner discussed above. Unplayed video sequences cached in surface control elements 86 are simply discarded, ignored, or erased.

Object Constraint Systems

Each scene observed by the operator of a virtual reality or interactive computer system has three kinds of objects: stationary scene objects which form the background, constrained objects that exhibit a limited ability to move against the background, and free-floating or unconstrained objects. In most cases, the largest number of objects in a given scene are of the stationary category, followed next by constrained and then free-floating objects. Regardless of the type of object, current virtual reality or interactive computer systems require each object to be fully rendered for each frame in which it is displayed. The present invention reduces the number of calculations required to present scenes. However, the number of motion vectors available may be limited by the size of the motion vector database. Accordingly, storing a large number of scenes including different possible positions for free-floating objects may not be practical.

The virtual projector of the preferred embodiment can also be used advantageously in this situation. In a preferred embodiment, free-floating objects (which are rendered in real time) can be projected on a second video display plane, which would overlay the video planes of the stationary and constrained motion prerendered objects. This allows unconstrained manipulation of free-floating objects using standard input or operator interface devices. And since free-floating objects tend to be small, the rendering of these objects in real time can be performed with fairly high resolution.

Representing Velocity Changes

Changes in an operator's apparent translational or rotational velocity in the virtual space can be controlled through the use of a variable speed video decoder 20 (see FIG. 8). If video decoder 20 is not a variable speed video decoder, realistic motion vector simulation of acceleration and deceleration can be achieved by duplication of frame data, and by frame "jumping". That is, the more duplicated frames there are in a video sequence, the slower the operator's apparent velocity. Conversely, by skipping frames in a video sequence, the operator's apparent velocity through the virtual space can be increased.

The present invention has been described in terms of a preferred embodiment. However, the scope of the invention is defined by the appended claims.

What is claimed is:

1. A method for generating a database of motion vectors and encoded digital video sequences, wherein each motion vector represents a particular rotation or translation within a virtual space, each motion vector has an associated encoded digital video sequence that shows the translation or rotation represented by that motion vector, and each encoded digital video sequence represents a plurality of still images, the method comprising the steps of:

imposing a coordinate system on a computer model of the virtual space, the coordinate system including a plurality of discrete points;

generating one or more motion vectors associated with each point, each motion vector representing either a rotation about that point or a translation to a different point;

generating instructions for a computer image rendering program, the instructions specifying which still images are to be rendered as part of the video sequence associated with each motion vector; and digitally encoding the video sequence associated with each motion vector.

2. A method as in claim 1 wherein each encoded digital video sequence has a last frame identical to a first frame of another encoded digital video sequence.

3. A method as in claim 2 wherein the video sequences are digitally encoded according to the MPEG-1 or MPEG-2 standards.

4. A method as in claim 3 wherein the first frame and the last frame of each video sequence are I frames.

5. A method for generating a database of motion vectors and encoded digital video sequences, wherein each motion vector represents a particular rotation or translation within a space, each motion vector has an associated encoded digital video sequence that shows the translation or rotation represented by that motion vector, and each encoded digital video sequence represents a plurality of still images, the method comprising the steps of:

imposing a coordinate system on a computer model of the space, the coordinate system including a plurality of discrete points;

generating one or more motion vectors associated with each point, each motion vector representing either a rotation about that point or a translation to a different point;

generating instructions for an automated camera, the instructions specifying which still images are to be photographed as part of the video sequence associated with each motion vector; and digitally encoding the video sequence associated with each motion vector.

6. A method as in claim 5 wherein each encoded digital video sequence has a last frame identical to a first frame of another encoded digital video sequence.

7. A method as in claim 6 wherein the video sequences are digitally encoded according to the MPEG-1 or MPEG-2 standards.

8. A method as in claim 7 wherein the first frame and the last frame of each video sequence are I frames.

9. In a computer system including a database of motion vectors, wherein each motion vector represents a particular rotation or translation within a virtual space, each motion vector has an associated encoded digital video sequence that shows the translation or rotation represented by that motion vector, and each encoded digital video sequence has a last frame identical to a first frame of another encoded digital video sequence, a method for displaying a concatenated series of video sequences, comprising the steps of:

(a) decoding and playing a first video sequence via a first virtual projector;

(b) queuing a second video sequence with a second virtual projector, the second virtual projector synchronized such that the first frame of the second video sequence is identical to the last frame of the first video sequence; and (c) decoding and playing the first frame of the second video sequence with the second virtual projector when the last frame of the first video sequence is played by the first virtual projector.

10. A method as in claim 9 wherein the video sequences are digitally encoded according to the MPEG-1 or MPEG-2 standards.

11. A method as in claim 10 wherein the first frame and the last frame of each video sequence are I frames.

12. A method as in claim 9 further comprising:

(d) repeating steps (a)–(c) with a plurality of other video sequences.

13. In a computer system including a database of motion vectors, wherein each motion vector represents a particular rotation or translation within a virtual space, each motion vector has an associated encoded digital video sequence that shows the translation or rotation represented by that motion vector, and at least one encoded digital video sequence is linked both in space and in time to another encoded digital video sequence, a method for generating a navigational framework of the virtual space, comprising the steps of:

defining the number of degrees of freedom allowable for an operator navigating through the virtual space, the operator having a position, orientation, and velocity in the virtual space;

defining areas within the virtual space in which an operator is permitted to navigate; and generating a state machine for determining which particular motion vector, and therefore which associated encoded digital video sequence, should be accessed from the database at any given time, the determination of the state machine based upon the number of degrees of freedom allowable the operator navigating through the virtual space, the position, orientation, and velocity of the operator in the virtual space, the definition of navigable areas within the virtual space, and which motion vector had been previously accessed.

\* \* \* \* \*